J. Jordan Jr. & I. Eustice.
Pulp Grinder.
No. 1,088. Reissued Dec. 4, 1860.
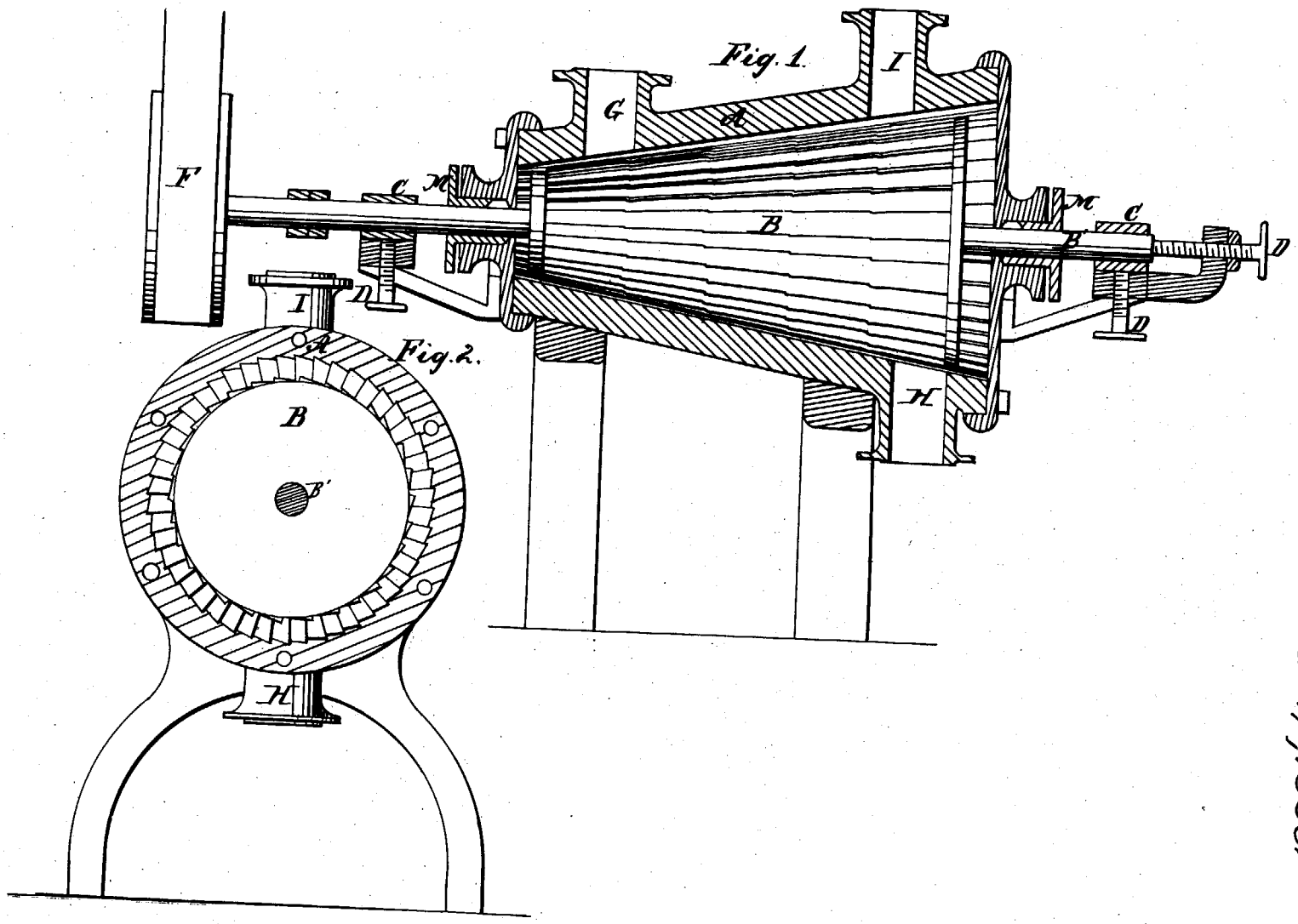

UNITED STATES PATENT OFFICE.

J. JORDAN, JR., AND T. EUSTICE, OF HARTFORD, CONNECTICUT, ASSIGNORS TO J. JORDAN, JR., H. KENEY, AND GRANT, WARREN & CO.

IMPROVEMENT IN MACHINES FOR GRINDING AND SIZING PAPER-PULP.

Specification forming part of Letters Patent No. 20,277, dated May 18, 1858; Reissue No. 1,088, dated December 4, 1860.

*To all whom it may concern:*

Be it known that by a proper instrument or proper instruments of writing, duly recorded in the books of the United States Patent Office, the subscribers have become the sole owners of all the right, title, and interest of JOSEPH JORDAN, Jr., and THOMAS EUSTICE, of the city and county of Hartford, and State of Connecticut, in an invention of an Improved Machine for Grinding and Sizing Paper-Pulp, for which the said JORDAN and EUSTICE did apply for and obtain Letters Patent of the United States of America, such Letters Patent being numbered 20,277, and bearing date the 18th day of May, A. D. 1858; that believing such Letters Patent as originally issued to be inoperative or invalid by reason of a defective or insufficient description or specification and claim, they do hereby declare the said invention to be fully described and represented in the following specification and the accompanying drawings, of which—

Figure 1 is a longitudinal sectional view, and Fig. 2 a transverse section, of such machine.

The nature of the said invention consists in an improved pulp making and sizing engine or machine as constructed not only of a single conical grinder and outer grinding shell or case thereto, but with pipes for the introduction of the rags and the size and the eduction of both, arranged with reference to the axis and ends of the grinder substantially in manner and so as to enable the grinder to act, in reducing the rags to pulp and mixing the sizing therewith, as hereinafter explained.

In carrying out the said invention we employ an outer conical grinder-case, A, (see Figs. 1 and 2,) and an inner conical frustum or grinder, B, the latter being arranged within the former, and both being disposed with their common axle horizontal, or thereabout.

In Fig. 1 the conical grinder is not exhibited in section. Its shaft B′ is supported in suitable bearings or boxes, C C, and runs in stuffing-boxes, M M, applied to the two heads of the case. The said shaft is provided with adjusting-screws D D D, &c., so applied to it as to enable it to be moved either longitudinally or transversely, as occasion may require, in order to effect the proper adjustment of the grinder B within its case, either for fine or coarse grinding or otherwise. The external surface of the grinder B, as well as the internal surface of the case, is provided with ranges of teeth or cutters, by which, while the grinder may be revolving within the case, they may cause any rags when in the latter to be properly reduced. A driving-pulley, F, is fixed to the shaft of the grinder B. The case A is furnished with two induction-pipes, G I, and one eduction-pipe, H, they being arranged with reference to the ends of the grinder as shown in the drawings. The rags are fed into the case through the conduct G, the sizing being allowed to flow into the pipe I and from thence into the said case. After the rags may have been suitably reduced and mixed with the sizing, the pulpy mass will be discharged through the eduction-pipe H.

The peculiar arrangement of the pulp and size induction-pipes G I and the common eduction-pipe H with reference to the conical grinding-surfaces, having their common axis arranged horizontally, and the rotary grinder being made adjustable with respect to its case in manner as explained, renders the machine of great value and highly effective in operation. By the said arrangement of parts the sizing is not introduced into the pulp until the latter is nearly, if not entirely, reduced to the fineness that may be required. By being introduced into the upper part of the case the sizing will be more thoroughly mixed with the pulp before it may be discharged by the pipe H. The reduction of the rags first takes place near the smaller end of the rotary grinder, the ground rags being finally discharged under the said grinder and near to its larger end, the construction and arrangement of the grinder being such as to make the passage of the pulp from the induction-pipe at one end of the case to the eduction-pipe at the opposite end thereof wholly dependent upon the motion of the grinders.

We are aware that a conical grinder arranged within and so as to rotate in an inclosing conical case or grinder is not new for grinding or reducing bark, corn, rags, or other matters, and therefore we lay no claim to such.

We are also aware of the corn and cob grinder exhibited and claimed in No. 12,356 of United States Patents, the same differing materially from our invention, for the first is provided with two sets of grinders applied to one shaft, one of such grinders being furnished with two induction-pipes, while the common eduction-pipe is at the lower end of the grinder. Such an arrangement of the grinders will not admit of the adjustment of the inner to the outer grinder by the longitudinal movement of the former within the latter, nor will it suffice for grinding pulp and mixing size with it, as the introduction of the size and rags at or near one end of the grinder and causing such to work through the entire machine from one end to the other is not so advantageous as introducing the rags and the size at or near opposite ends, respectively, of a single conical grinder having its eduction-pipe at or near its larger end, as in our machine.

We would further remark that we do not claim the introduction of water into the case of a grinder to facilitate the operation of such grinder.

What we claim, therefore, is—

1. Our improved machine for the manufacture and sizing of pulp—that is, as constructed of a single conical grinder and outer shell, and with pipes for the introduction of the rags and the size and the eduction of both, rraanged with reference to the axis and ends of the grinder substantially in manner and so as to enable the grinder to operate to reduce the rags to pulp and mix the sizing therewith, as hereinbefore explained.

2. The introduction of the sizing into the grinder-case and directly between the reducing-surfaces, when employed as specified in the grinding of pulp or material used in making paper.

JOSEPH JORDAN, JR.
HENRY KENEY.
GRANT, WARREN & CO.

Witnesses to the signatures of Joseph Jordan, jr., and Henry Keney:
H. K. W. WELCE,
E. GOODWIN, Jr.

Witnesses to the signature of Grant, Warren & Co.:
F. A. JEWETT,
H. K. POPE.